US006221190B1

(12) United States Patent
Shimosato et al.

(10) Patent No.: US 6,221,190 B1
(45) Date of Patent: Apr. 24, 2001

(54) METHOD AND APPARATUS FOR PROCESSING GLASS PANEL

(75) Inventors: Yoshikazu Shimosato, Yawata; Tadashi Seki, Toyonaka, both of (JP)

(73) Assignee: Chugai Ro Co., Ltd., Osaka-Fu (JP)

( * ) Notice: Subject to any disclaimer, the term of this patent is extended or adjusted under 35 U.S.C. 154(b) by 0 days.

(21) Appl. No.: 09/050,044

(22) Filed: Mar. 30, 1998

(30) Foreign Application Priority Data

Aug. 29, 1997 (JP) ........................................ 9-234266

(51) Int. Cl.[7] ........................ B32B 17/00; E06B 3/677

(52) U.S. Cl. ........................ 156/104; 156/109

(58) Field of Search ........................ 156/104, 109, 156/107, 102, 99; 65/34; 141/7

(56) References Cited

U.S. PATENT DOCUMENTS

| | | | |
|---|---|---|---|
| 3,347,723 | * 10/1967 | Hill | 156/104 |
| 3,683,974 | * 8/1972 | Stewart et al. | 156/109 |
| 3,917,503 | * 11/1975 | Tamura et al. | 156/104 |
| 4,066,427 | * 1/1978 | Goto | 156/102 |
| 4,601,772 | * 7/1986 | McKelvey | 156/104 |
| 4,786,344 | * 11/1988 | Beuther | 156/109 |
| 4,963,206 | * 10/1990 | Shacklette et al. | 156/99 |

FOREIGN PATENT DOCUMENTS

| | | |
|---|---|---|
| 61-163534A | 7/1986 | (JP) . |
| 63-45728 | 11/1988 | (JP) . |
| 3-283232A | 12/1991 | (JP) . |
| 4-245138A | 9/1992 | (JP) . |
| 4-262339A | 9/1992 | (JP) . |

* cited by examiner

*Primary Examiner*—Michael W. Ball
*Assistant Examiner*—Barbara J. Musser
(74) *Attorney, Agent, or Firm*—Birch, Stewart, Kolasch & Birch, LLP

(57) ABSTRACT

A method and apparatus for fabricating a plasma display panel with increased efficiency and productivity is provided. A glass panel assembly P1 constructed from two glass plates W1, W2, which are joined together by a jig 10 with a sealant S applied along a periphery of one or the other of the opposing surfaces of the two glass plates W1, W2, is supported on an evacuating cart 20 in such a manner as to be positioned inside a furnace 1. The exhaust pipe Pa provided in any one of the glass plates W1, W2 is connected switchably between an evacuating system 25 and a discharge gas supply system 26. After evacuating the interior of the glass panel P2, a discharge gas is filled into the glass panel P2 and finally the exhaust pipe Pa is sealed and cut.

19 Claims, 4 Drawing Sheets

METHOD AND APPARATUS FOR PROCESSING GLASS PANEL

BACKGROUND OF THE INVENTION

The present invention relates to a method and apparatus for processing a glass panel.

A conventional process for fabricating a glass panel such as a vacuum heat-insulating glass panel or a plasma display panel (hereinafter abbreviated to PDP) comprises the step of sealing a glass panel assembly constructed from two glass plates, one with an exhaust pipe thereto, which are joined together by a jig such as a clip with a sealant applied to the periphery of one or the other of the opposing surfaces of the two glass plates, the step of evacuating the interior of the sealed glass panel through the exhaust pipe and the step of cutting and sealing up the exhaust pipe.

In the sealing step, the glass panel assembly is loaded into a batch-type sealing furnace and heated to a predetermined temperature (sealing temperature) to seal the two glass plates which are thus fabricated into a glass panel. In the evacuating step, many such glass panels, each with the exhaust pipe attached thereto, are loaded into a batch-type evacuating furnace and, while heating the glass panels at a predetermined temperature (evacuating temperature), an evacuating apparatus connected to the exhaust pipe is driven to evacuate the interior of the glass plate, and finally the exhaust pipe is sealed up and cut to complete the fabrication of the glass panel.

In particular, in the fabrication process of the PDP, the evacuating step is followed by the step of filling a discharge gas into the glass panel to a predetermined pressure (400 to 600 Torr), after which the exhaust pipe is sealed up and cut.

However, since the sealing step and the evacuating step are batch processes separately performed in special-purpose furnaces, raising and lowering the furnace temperature is repeated for each process, the resulting problem being that not only thermal efficiency is low but productivity also decreases enormously.

SUMMARY OF THE INVENTION

The present invention has been developed to substantially eliminate the above-described disadvantages.

It is therefore an object of the present invention to provide a method and apparatus for processing a glass panel in which not only thermal efficiency can be enhanced but productivity can also be improved.

According to the invention, there is provided a method for processing a glass panel, comprising the steps of:

supporting at least one glass panel assembly on an evacuating cart in such a manner as to be positioned inside a furnace, the glass panel assembly being constructed from two glass plates, any one of the glass panels being provided with an exhaust pipe, the glass plates being joined together by a jig with a sealant applied along a periphery of one or the other of the opposing surfaces of the two glass plates, the exhaust pipe being connected to an evacuating system;

sealing the two glass plates to form a glass panel by heating the glass panel assembly and melting the sealant while moving the evacuating cart through the furnace;

evacuating air and dirty gas between the two glass plates of the glass panel by the evacuating system until the predetermined degree of vacuum is achieved; and sealing and cutting the exhaust pipe.

In the above invention, the glass panel assembly with the exhaust pipe attached thereto is loaded onto the evacuating cart mounted with the evacuating system, and is passed through the sealing/evacuating furnace where the glass plates are sealed together with a sealant and then the interior is evacuated by a vacuum. After this evacuating step, the exhaust pipe is fused and sealed up. That is, the glass panel sealing and evacuation and exhaust pipe sealing steps are performed continuously as the evacuating cart moves. In this way, according to the present invention, since the sealing of the glass plates and the evacuation of the panel interior are not performed by batch processes as was the case with the prior art, not only thermal efficiency can be enhanced but productivity can also be improved.

Preferably, the exhaust pipe is connected switchably between the evacuating system and a discharge gas supply system, and wherein the method further comprises the step of filling a discharge gas into the glass panel after the step of evacuating and before the step of sealing and cutting.

In this case, the evacuating cart is mounted with a discharge gas supply system, and the step of filling a discharge gas is performed after the evacuating step but before the exhaust pipe sealing step. This contributes to increasing thermal efficiency and improving productivity of the PDP.

The present invention is also directed to an apparatus for processing a glass panel, comprising:

a plurality of evacuating carts for supporting at least one glass panel assembly, the glass panel assembly being constructed from two glass plates, any one of the glass panels being provided with an exhaust pipe, the glass plates being joined together by a jig with a sealant applied along a periphery of one or the other of the opposing surfaces of the two glass plates, each evacuating cart being provided with an evacuating system connected to the exhaust pipe and a sealing heater for fusing and cutting the exhaust pipe; and a furnace for heating the glass panel assembly on the plurality of evacuating carts which are moved on rails and charged into the furnace in a connected condition one behind another;

whereby the glass panel assembly is heated so that the sealant melted to seal the two glass plates and form a glass panel;

air between the two glass plates of the glass panel is evacuated by the evacuating system until the predetermined degree of vacuum is achieved; and the exhaust pipe is sealed and cut.

Preferably, the furnace has an opening in the furnace bed extending along the moving direction of the evacuating cart, the evacuating cart moves on the rails laid beneath the furnace bed, and the evacuating cart is provided with a plurality of mounting members each comprising a supporting pillar extending into the furnace through the opening in the furnace and a holding member for holding the glass panel assembly in the furnace. In this case, the supporting pillar of the mounting members are preferably provided with an insulating member for closing the opening of the furnace.

Preferably, the furnace comprises a sealing zone, an evacuating zone and a cooling zone, and wherein in the sealing zone the two glass plates are sealed to form the glass panel, in the evacuating zone air and dirty gas in the glass panel are evacuated, and in the cooling zone the glass panel is cooled.

Preferably, the exhaust pipe is connected switchably between the evacuating system and a discharge gas supply system, and wherein a discharge gas is filled into the glass panel from the discharge gas supply system after evacuating the glass panel and before sealing and cutting the exhaust pipe.

Preferably, the appratus further comprises a discharge gas filling/sealing zone, whereby in the discharge gas filling/sealing zone a discharge gas is filled into the glass panel from the discharge gas supply system after evacuating the glass panel and before sealing and cutting the exhaust pipe.

Preferably, the apparatus further comprises;

a second rails laid on one side of the furnace on which the evacuating carts move in a direction opposite to the moving direction of the evacuating carts on the first rails;

a charge side transfer car for transferring the evacuating cart to the upstream end of the first rails from the downstream end of the second rails; and a discharge side transfer car for transferring the evacuating cart to the upstream end of the second rails form the downstream end of the first rails;

wherein the evacuating carts are circulated for use.

BRIEF DESCRIPTION OF THE DRAWINGS

Further objects and advantages of the present invention will become clear from the following description taken in conjunction with the preferred embodiments thereof with reference to the accompanying drawings, in which.

DETAILED DESCRIPTION OF THE PREFERRED EMBODIMENTS

Figure 1:
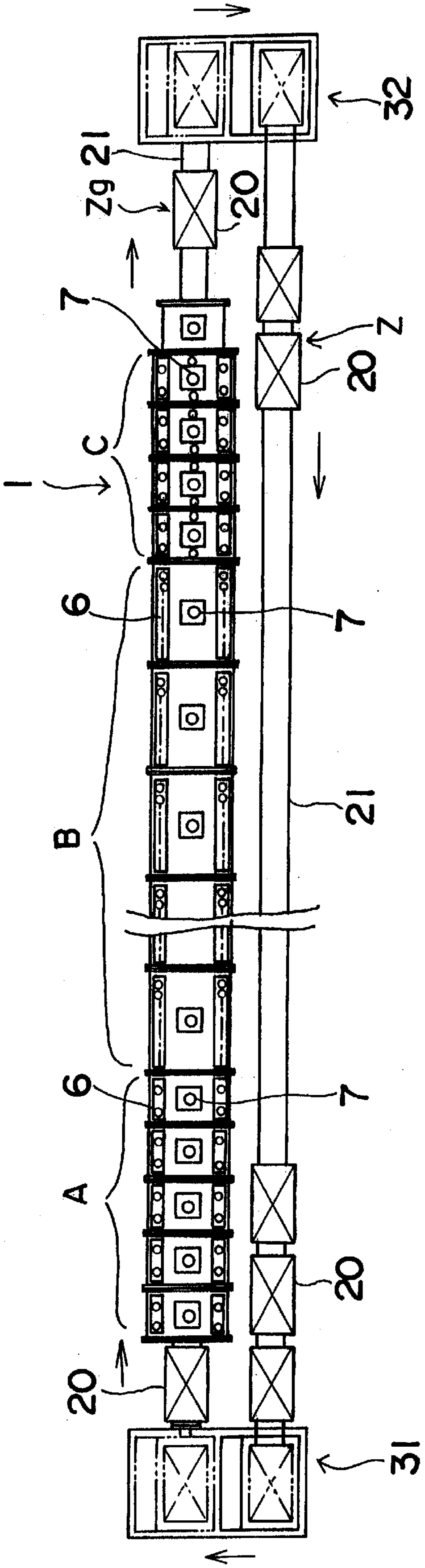
FIG. 1 is a diagrammatic plan view of sealing, evacuating and discharge gas filling equipment for fabricating plasma display panels as glass panels according to the present invention.

The embodiment hereinafter described employs a PDP as a glass panel. In the drawings, reference numeral 1 indicates a sealing/evacuating furnace which has an opening 3 in the furnace bed 2 extending along the entire length thereof. The sealing/evacuating furnace 1 comprises a sealing zone A, an evacuating zone B, and a cooling zone C, each consisting of a plurality of chambers.

Figure 2:
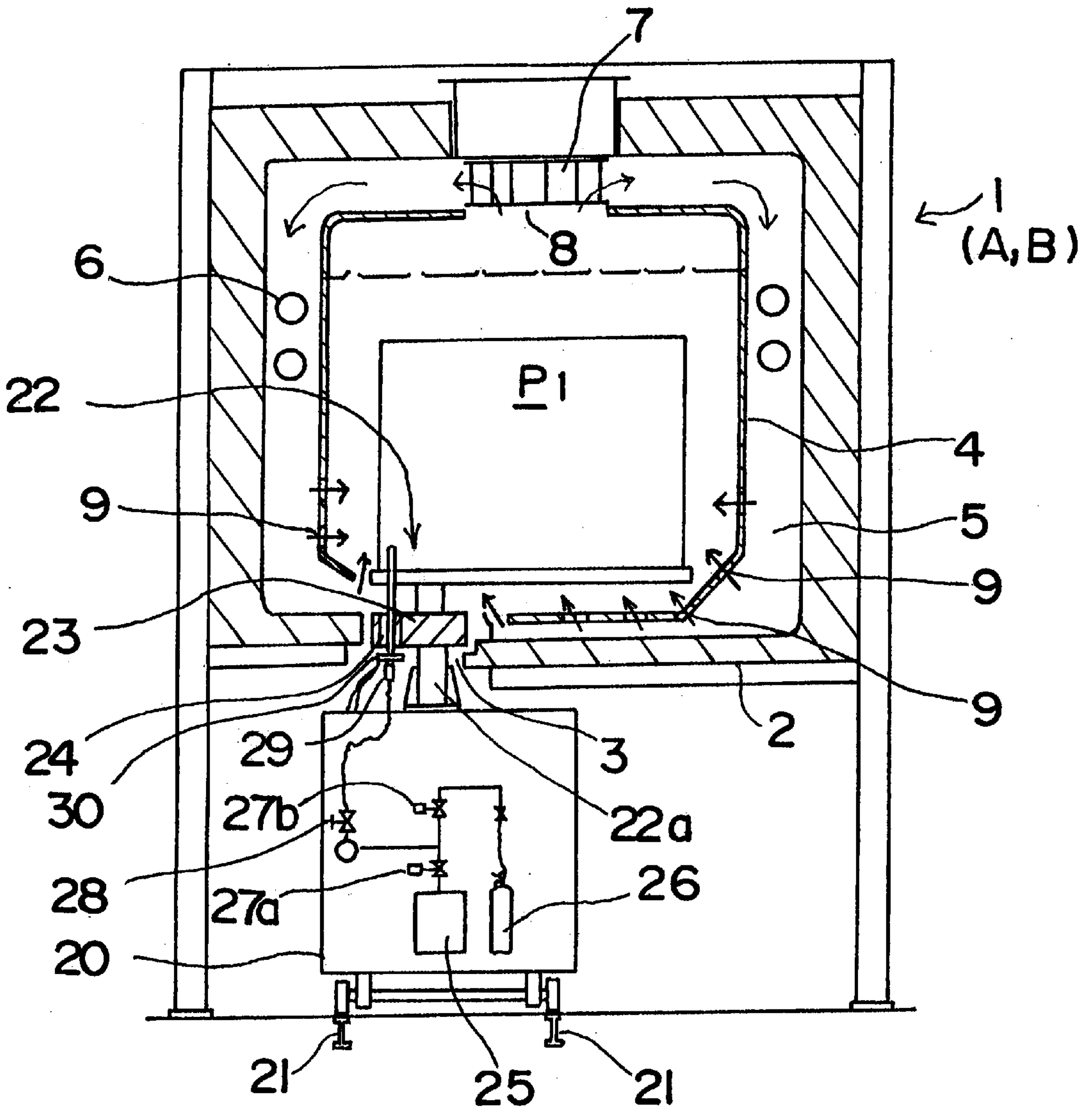
FIG. 2 is an enlarged cross-sectional view of a sealing (or evacuating) zone in FIG. 1.

In the furnace 1, the sealing zone A and evacuating zone B are provided with circulating baffles 4, as shown in FIG. 2 to form a circulating passage 5 between the circulating baffles 4 and the inner surface of the furnace 1. A heating source 6 such as radiant tube burners or electric heaters is arranged in the circulating passage 5. Furnace atmosphere is drawn through an inlet 8 by means of a circulating fan 7, is heated by the heating source 6, and is delivered through delivery ports 9. The atmosphere is thus circulated in the furnace 1 to heat the PDP assembly P1 hereinafter described.

The cooling zone C has, in addition to the heating source 6 in the sealing zone A and evacuating zone B, a cooling source (not shown) such as a cooling air supply tube. Otherwise, the construction is the same as that of the sealing zone A (or the evacuating zone B).

Figure 4:
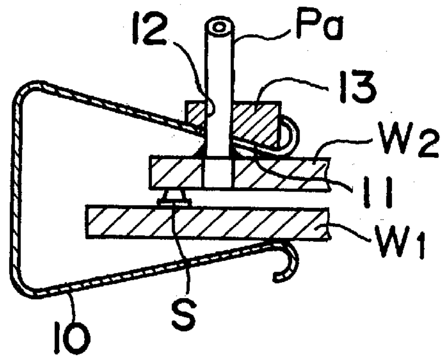
FIG. 4 is an enlarged partial sectional view of a PDP assembly.

The PDP assembly P1 comprises a front glass plate W1 and a back glass plate W2 with an exhaust pipe Pa attached thereto, as shown in FIG. 4. The front glass plate W1 and the back glass plate W2 face each other with a sealant S applied along the periphery of one or the other of the opposing surfaces thereof, and are rigidly fastened together by clamping them with a jig 10 such as a clip. The sealant S is prepared by kneading low-melting composite glass (a mixture of $PbO \cdot B_2O_3$-based low-melting glass powder and special ceramic powder) with vehicle added consisting of a synthetic resin binder dissolved in a solvent. In the figure, the jig 10 is of a type that is applied to the exhaust pipe Pa. A slit 11 slightly larger in diameter than the exhaust pipe Pa is formed in one wing part of the jig 10. With the exhaust pipe Pa passed through the slit 11, a holding member 13 having a through-hole 12 is fitted to hold the exhaust pipe Pa in place. The method of holding the exhaust pipe Pa is not limited to using the holding member 13, but other means or construction may be used.

The slit 11 need not be provided in clips that clamp the glass plates W1, W2 at other portions than the portion where the exhaust pipe Pa is mounted.

Turning back to FIGS. 2 and 3, an evacuating cart 20 is moved by a pusher (not shown) on the rails 21 laid beneath the furnace bed 2. On the upper surface of the evacuating cart 20 are arranged a plurality of mounting members 22. Each mounting member 22 consists of a supporting pillar 22*a* extending into the furnace 1 through the opening 3 in the sealing/evacuating furnace 1 and a holding member 22*b* for holding the PDP assembly P1 in a substantially vertical position and parallel to the widthwise direction of the furnace. The support pillars 22*a* of the mounting members 22 are provided with an insulating member 23 extending along the entire length of the evacuating cart 20. The insulating member 23 is formed in such a manner as to close the opening 3 with a slight clearance provided therebetween. The insulating member 23 is provided with a hole 24 through which the exhaust pipe Pa is inserted.

Further, the evacuating cart 20 is mounted with an evacuating system having a vacuum pump 25 and a discharge gas supply system having a discharge gas cylinder 26. They are connected to pipe fittings 29 via electromagnetic valves 27*a*, 27*b*, and 28. The evacuating cart 20 is also provided with a sealing heater 30 for fusing the exhaust pipe Pa on the PDP assembly P1.

In the present embodiment, the rails 21 are provided on one side of the sealing/evacuating furnace 1 as well as beneath the furnace 1, as shown in FIG. 1. On the rails 21 on the side of the sealing/evacuating furnace 1 is provided a loading/unloading zone Z. Each pair of rails 21 is connected to a charge transfer car 31 at one end and a discharge transfer car 32 at the other end so that the evacuating cart 20 is circulated for use. A discharge gas filling/sealing zone Zg is provided between the cooling zone C and the discharge transfer car 32.

Next, the method of PDP processing will be described.

First, the PDP assembly P1 is loaded onto the evacuating cart 20 in a loading/unloading zone Z.

Figure 3:
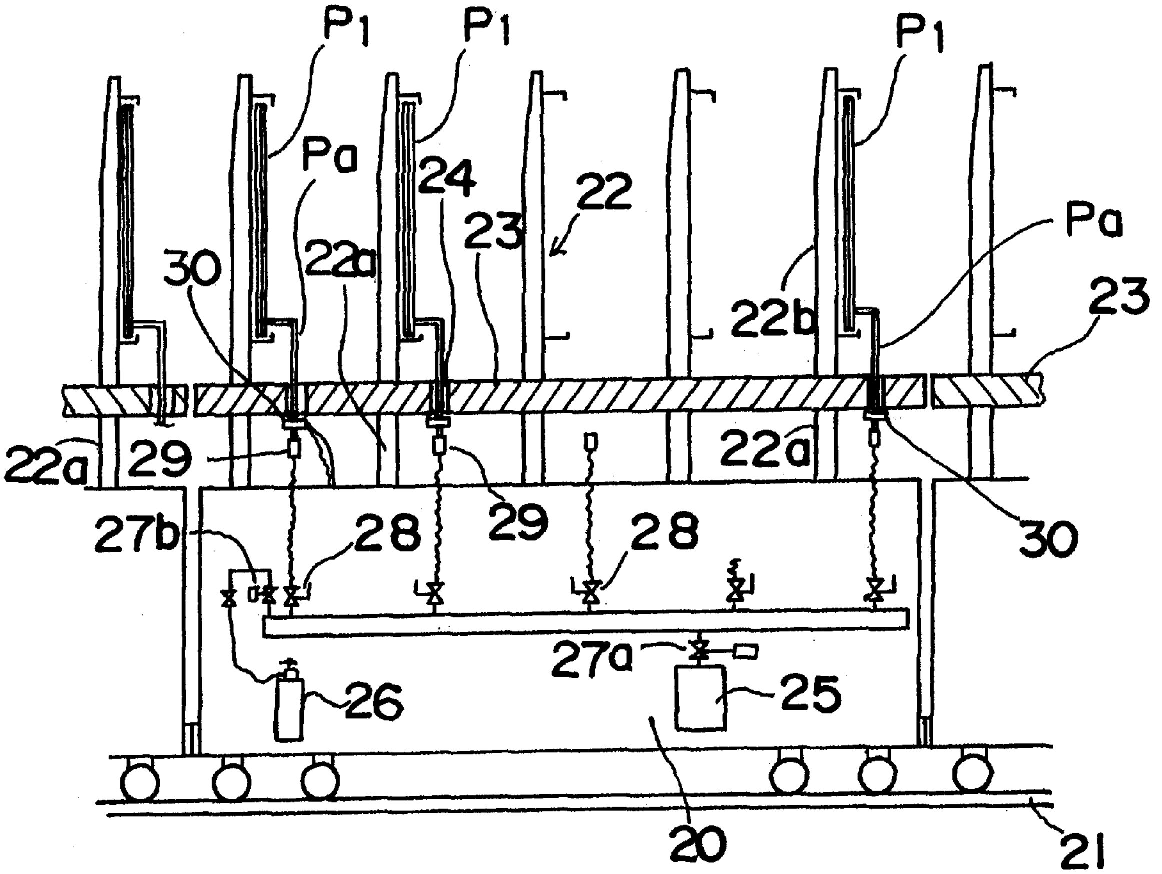
FIG. 3 is an enlarged longitudinal-sectional view of an evacuating cart in FIG. 2.

In loading the PDP assembly P1, the exhaust pipe Pa is inserted into a hole 24 opened through the insulating member 23, and the PDP assembly P1 is fixed to the mounting member 22 by using suitable means such as a clip not shown so that the PDP assembly P1 is placed on the evacuating cart 20 and held rigidly in a substantially vertical position and parallel to the furnace width, as shown in FIGS. 2 and 3. Then, the exhaust pipe Pa is connected to the pipe fitting 29. Further, the sealing heater 30 is attached to the exhaust pipe Pa.

The evacuating cart 20, which is loaded with many such PDP assemblies P1, is transported by suitable means to the charge transfer car 31, where the evacuating cart 20 is redirected to the charge side of the sealing/evacuating furnace 1. The evacuating cart 20, actually a train of evacuating carts 20 connected one behind another as shown in FIG. 3, is then moved by a pusher or the like into the sealing/evacuating furnace 1. Accordingly, the opening 3 is substantially closed with the insulating members 23 on the evacuating carts 20, thus preventing the outside air from entering the interior of the furnace 1.

Figure 5:
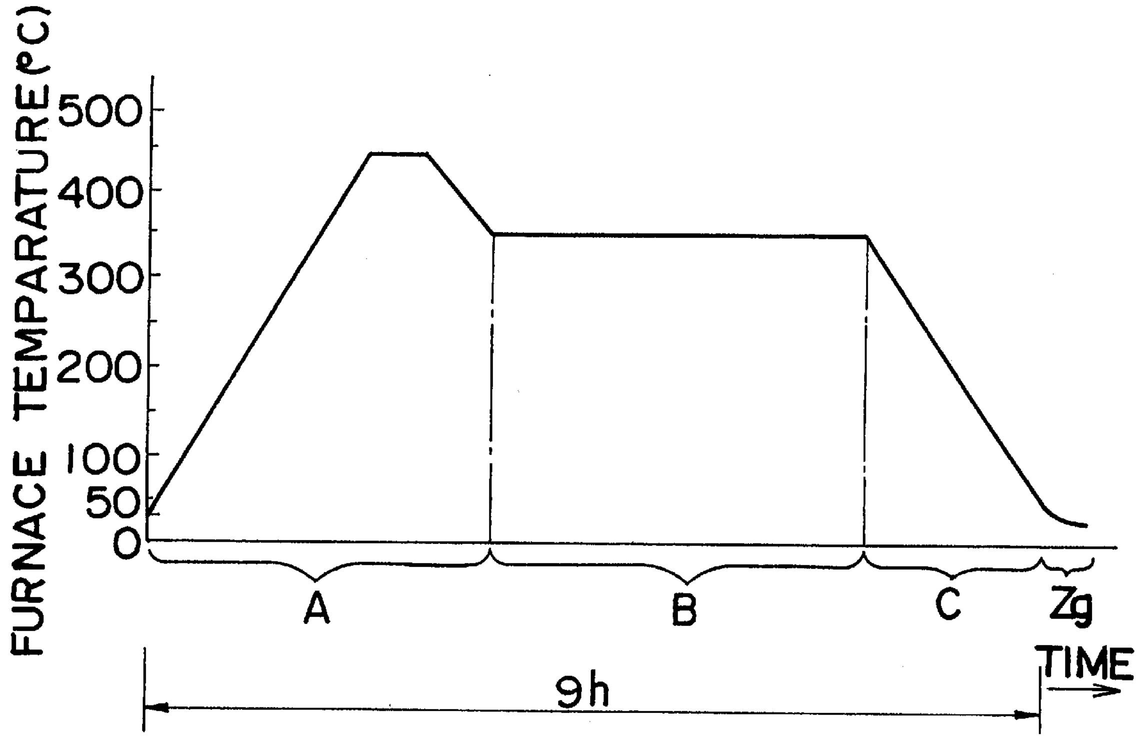
FIG. 5 is a heat curve for a sealing and evacuating furnace.

When the evacuating cart 20 is charged into the furnace 1, each assembly P1 is heated in accordance with the heat curve shown in FIG. 5 while it is being passed through the sealing/evacuating furnace 1. First, the sealant S melts in the sealing zone A so that the glass plates W1 and W2 are sealed together and the PDP assembly P1 is thus fabricated into a glass panel P2. When the evacuating cart 20 enters the evacuating zone B, the electromagnetic valves 27*a* and 28 are opened so that the interior of each glass panel P2 now communicates with the vacuum pump 25. Air and dirty gas inside the glass panel P2 are exhausted together with gasses released from the glass plates W1 and W2, until the interior of the glass panel P2 is evacuated to $10^{-4}$ to $10^{-7}$ Torr. The glass panel P2 is then passed through the cooling zone C and discharged outside the furnace 1.

When the glass panel P2 enters the discharge gas filling/sealing zone Zg, the vacuum pump 25 is stopped and the valve 27*a* is closed and 27*b* opened so that a discharge gas, such as neon (Ne), helium (He), argon (Ar), and/or xenon (Xe), is filled from the discharge cylinder 26 into the glass panel P2 up to a specified pressure (200 to 760 Torr).

When the discharge gas has been filled into the glass panel P2, then the sealing heater 30 is energized to seal up and cut the exhaust pipe Pa to complete the fabrication of the desired PDP.

Thereafter, the evacuating cart 20 is moved through the transfer car 32 to the loading/unloading zone Z where the processed PDPs are unloaded and new PDP assemblies P1 are loaded for the processing described above.

The above description has dealt with the processing method for a PDP in which a discharge gas is filled into the glass panel, but it will be appreciated that the present invention can also be applied to a processing method for an vacuum heat-insulating glass panel. In that case, the discharge gas filling/sealing zone Zg is not provided, and after evacuating the interior to a predetermined pressure, the vacuum pump 25 is stopped and the sealing heater 30 is energized to seal up and cut the exhaust pipe Pa.

Although the present invention has been fully described by way of the examples with reference to the accompanying drawing, it is to be noted that here that various changes and modifications will be apparent to those skilled in the art. Therefore, unless such changes and modifications otherwise depart from the spirit and scope of the present invention, they should be construed as being included therein.

What is claimed is:

1. A method for processing a glass panel, comprising the steps of:

supporting at least one glass panel assembly on an evacuating cart in such a manner as to be positioned inside a furnace, the glass panel assembly being constructed from two glass plates, any one of the glass panels being provided with an exhaust pipe, the glass plates being joined together by a jig with a sealant applied along a periphery of one or the other of the opposing surfaces of the two glass plates, the exhaust pipe being switchably connected between an evacuating system and a discharge gas supply system;

continuously moving the evacuating cart through a sealing zone, an evacuating zone and a cooling zone in the furnace;

sealing the two glass plates to form a glass panel by heating the glass panel assembly and melting the sealant in the sealing zone to form a gap between the two glass plates;

evacuating the gap between the two glass plates of the glass panel by the evacuating system in the evacuating zone until a predetermined degree of vacuum is achieved;

cooling the glass panel in the cooling zone;

filling a discharge gas into the gap between the plates through the exhaust pipe from the discharge gas supply system after the glass panel has been conveyed out of the furnace; and sealing and cutting the exhaust pipe.

2. The method of claim 1, wherein the sealing zone of the furnace heats the glass plates to a temperature of at least about 400° C.

3. The method of claim 1, wherein the step of evacuating air and dirty gas further includes the step of lowering the pressure within the glass panel to between about $10^{-4}$ and $10^{-7}$ Torr.

4. The method of claim 1, wherein the step of filling a discharge gas into the glass panel includes the step of filling the glass panel with at least one gas selected from the group consisting of neon, helium, argon and xenon.

5. The method of claim 4, wherein the discharge gas is filled to a pressure of between about 200 and 760 Torr.

6. The method of claim 4, wherein the step of filling a discharge gas into the glass panel further includes the step of opening an electromagnetic valve to allow discharge gas to flow into the glass panel.

7. The method of claim 2, wherein the step of sealing and cutting the exhaust pipe includes the step of energizing a sealing heater provided on the evacuating cart after the discharge gas has been filled in the glass panel.

8. A method for processing glass panels comprising:

providing an evacuating cart including a plurality of supporting fixtures, an evacuating system and a discharge gas system, the evacuating system and the discharge gas system being linked to at least one exhaust pipe through a plurality of valves;

supporting at least one glass panel on the evacuating cart, each glass panel including a pair of opposed glass plates, an interior of each glass panel being initially connected to the evacuating system and the discharge gas system by a respective one of said at least one exhaust pipes;

advancing the evacuating cart through a sealing zone of a furnace, wherein pairs of glass plates are bonded together by heat from the furnace;

advancing the evacuating cart through an evacuating zone of the furnace;

removing gases from the interior of the at least one glass panel using the evacuating system;

allowing the at least one glass panel to cool;

filling the interior of the at least one glass panel with a discharge gas from the discharge gas system after the glass panel has been conveyed out of the furnace;

sealing the at least one exhaust pipe; and removing the at least one glass panel from the evacuating cart.

9. The method of claim 8, wherein the step of filling the interior of the at least one glass panel includes the step of filling the interior with at least one gas selected from the group consisting of neon, helium, argon and xenon.

10. The method of claim 9, wherein the discharge gas is filled to a pressure of between about 200 and 760 Torr.

11. The method of claim 8, wherein the step of advancing the cart through the sealing zone of the furnace includes the step of heating the at least one glass panel to a temperature of at least about 400° C.

12. The method of claim 8, wherein the step of removing gases from the interior of the at least one glass panel includes the step of lowering the pressure within the at least one glass panel to between about $10^{-4}$ and $10^{-7}$ Torr.

13. The method of claim 8, wherein the step of filling the interior of the at least one glass panel further includes the step of opening at least one of said plurality of valves, wherein the valves operate electromagnetically.

14. The method of claim 8, further comprising the step of cutting the at least one exhaust pipe so that a respective one of said at least one panels is no longer connected to the evacuating system and the discharge gas system.

15. A method for processing glass panels comprising: providing a plurality of evacuating carts, each cart including:

a plurality of supporting fixtures;

an evacuating system; and a discharge gas system, the evacuating system and the discharge gas system being linked to a plurality of exhaust pipes through a plurality of valves;

providing a plurality of glass panels, each glass panel including a pair of spaced glass plates and a sealing material disposed between the plates, the spaced glass plates forming an interior for each glass panel;

supporting the plurality of glass panels on the supporting fixtures;

sequentially advancing the plurality of evacuating carts through a sealing zone of a furnace, wherein the pairs of glass plates are bonded together by heat from the furnace;

sequentially advancing the plurality of evacuating carts through an evacuating zone of the furnace;

removing gases from the interior of the glass panels supported on each cart using the evacuating system associated with each cart;

filling the interior of the panels supported on each cart with a discharge gas from the discharge gas system associated with each cart after the glass panels have been conveyed out of the furnace;

after the interior of the glass panels on a respective evacuating cart have been filled, removing the glass panels from the respective cart at a loading/unloading zone; and after the glass panels have been removed from an evacuating cart, supporting a plurality of glass panels on the supporting fixtures of the evacuating cart at the loading/unloading zone.

16. The method of claim 15, wherein filling the interior of a glass panel includes the step of filling the glass panel with at least one gas selected from the group consisting of neon, helium, argon and xenon.

17. The method of claim 16, wherein the discharge gas is filled to a pressure of between about 200 and 760 Torr.

18. The method of claim 15, wherein advancing a cart through the sealing zone of the furnace includes the step of heating the glass panels on the cart to a temperature of at least about 400° C.

19. The method of claim 15, wherein removing gases from the interior of a glass panel includes the step of lowering the pressure within the glass panel to between about $10^{-4}$ and $10^{-7}$ Torr.

* * * * *